United States Patent [19]
Jones

[11] Patent Number: 5,544,556
[45] Date of Patent: Aug. 13, 1996

[54] REVERSIBLY ROTATABLE CHUCK WITH INTERNAL CAM FOR SHIFTING WORK AXIS

[75] Inventor: Russell W. Jones, Lebanon, Ohio

[73] Assignee: Cincinnati Milacron Inc., Cincinnati, Ohio

[21] Appl. No.: 232,973

[22] Filed: Apr. 25, 1994

[51] Int. Cl.$^6$ ............... B23B 1/00; B23B 15/00; B23B 31/00
[52] U.S. Cl. .................. 82/1.11; 82/165; 279/6
[58] Field of Search ............... 82/1.11, 129, 151, 82/155, 165, 169; 279/6; 142/55, 57; 408/150, 151, 187, 199, 200; 451/43, 399, 400, 251; 409/219

[56] References Cited

U.S. PATENT DOCUMENTS

| | | | |
|---|---|---|---|
| 2,456,776 | 12/1948 | Faust | 279/6 |
| 2,462,501 | 2/1949 | Hohwart et al. | 279/46 |
| 2,824,744 | 2/1958 | Peters | 279/2 |
| 3,233,480 | 2/1966 | Briney, Jr. et al. | 408/151 |
| 3,583,108 | 6/1971 | Oishi et al. | 51/237 |
| 4,067,586 | 1/1978 | Morawski | 279/1 |
| 4,269,001 | 5/1981 | Bottomley | 51/237 |
| 5,249,394 | 10/1993 | Griswold | 51/281 |

FOREIGN PATENT DOCUMENTS 1125420  8/1968  United Kingdom ............ B23B 31/02

*Primary Examiner*—M. Rachuba
*Assistant Examiner*—Kenneth S. Hansen
*Attorney, Agent, or Firm*—Thomas M. Farrell

[57] ABSTRACT

A chuck body has an internal cam unit eccentrically mounted within antifriction bearings, and the cam unit includes a workpiece gripper. A radial pin extends through the chuck body into a peripheral slot of the cam unit. When rotating in a first rotary direction, the chuck body and cam unit rotate in unison and a first workpiece diameter may be machined. When the rotation of the chuck body is reversed, inertial forces acting on the cam unit prevent immediate reversal of the cam unit rotation, and the pin moves through the peripheral slot, contacting the opposite end and driving the cam unit in reverse rotation; this relative motion between the chuck body and cam unit causes the workpiece to become offset, displacing the first workpiece axis from the chuck body axis of rotation. Consequently, as the reverse rotation is continued, a second workpiece diameter may be is machined about the chuck axis of rotation; the second diameter will be eccentric to the first diameter.

4 Claims, 5 Drawing Sheets

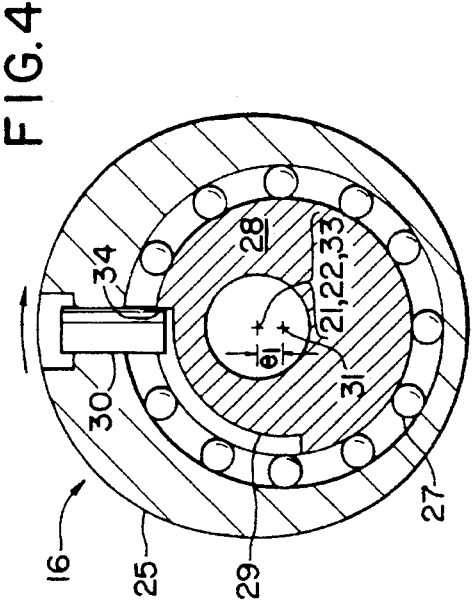
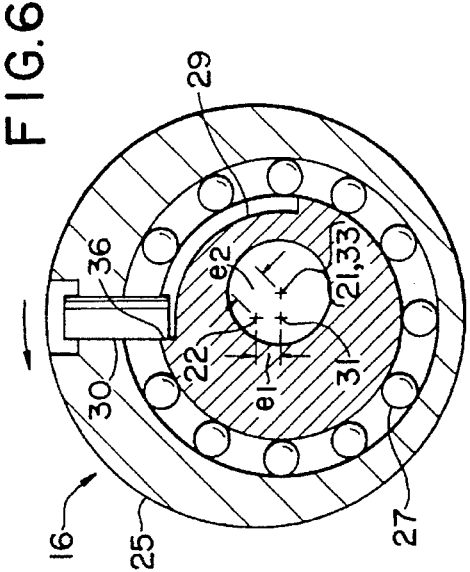
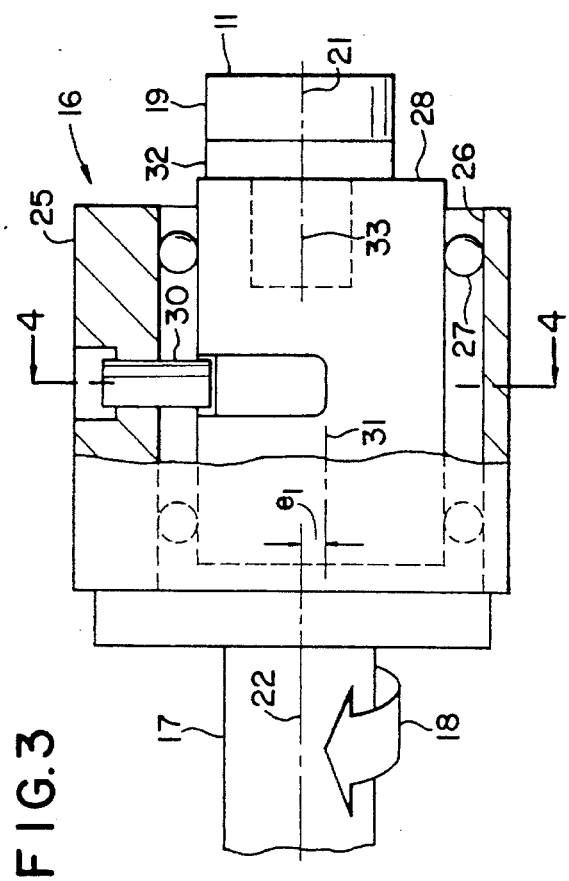
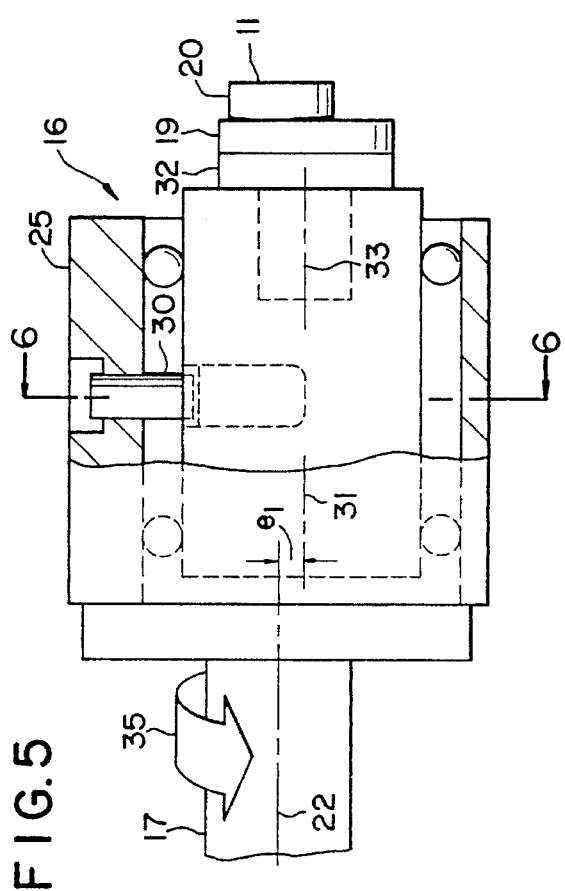

REVERSIBLY ROTATABLE CHUCK WITH INTERNAL CAM FOR SHIFTING WORK AXIS

FIELD OF THE INVENTION

The invention relates generally to rotary workholding chucks, and particularly to workholding chucks for rotating a workpiece about two different axes.

BACKGROUND OF THE INVENTION

Machine tools employ rotary workholding chucks for a variety of operations, including grinding and turning of diameters of parts of rotation. In turning and grinding machines, a chuck body is usually mounted to a rotatable spindle, and the chuck body includes means for grasping a workpiece for rotation. The chuck and workpiece are then rotated in unison to perform a machining operation.

In some instances, it is necessary to machine a second diameter on a workpiece, not concentric with a first machined diameter. The workpiece is then clamped in a rotary chuck or fixture which is adapted for supporting the primary axis off the axis of rotation, so that the part may be rotated about the axis of rotation and subsequently machined, producing the eccentric diameter.

One common workpiece having eccentric diameters, is the crankshaft of an internal combustion engine, where the crankshaft has a main axis of rotation, to be supported in main bearings of an engine, and has integral eccentric crank pins, which are each to be attached to a piston-connecting rod.

Known devices for supporting and driving a crankshaft in a grinding machine, for example, are shown in the following references:

U.S. Pat. No. 4,269,001, of H. G. Bottomley, issued May 26, 1981, entitled Work Clamping Fixture, includes a workrest portion for supporting the main bearing diameter of a double crank pin crankshaft, where a lever action clamp secures the main bearing diameter in the fixture. For a first machining operation, the first crank pin is located coaxially with the rotary axis of the fixture and machine spindle. During such operation, the main bearing diameter and second crank pin diameter gyrate around the first crank pin axis. Then the machine is stopped, the workpiece is unclamped, and the workpiece is rotated about its main bearing axis So that the part is turned 180°, and the second crank pin is therefore placed coaxially with the fixture axis of rotation. The part is then reclamped and the second crank pin is machined. The clamping fixture includes a piston powered pivotal clamp finger. The device also includes springs for assisting in movement of the clamp finger, and a rack and pinion device for shifting the finger pivot to provide clearance when loading a workpiece.

U.S. Pat. No. 3,583,108, of K. Oishi et al., issued Jun. 8, 1971, entitled Machine Tool for Grinding Pins of a Crankshaft, is also a fixture for clamping on the main bearing diameter of a crankshaft. An indexing disk is attached to the crankshaft, and several crank pins are alternately positioned onto the central rotary axis of the spindle. Periodically, the workpiece is automatically rotated about its main bearing axis by a pair of gears, one attached to a shaft concentric with the spindle axis, and a mating gear attached to the indexing disk so that the crankshaft can be rolled over. When the respective crank pin is to be positioned about the spindle axis, the indexing disk is rotated to position against a stop finger.

In each of the foregoing patents, the clamp force on the workpiece must be released so that the workpiece can be repositioned relative to the chuck or fixture.

U.S. Pat. No. 5,249,394, of R. E. Griswold, issued Oct. 5, 1993, entitled Chuck Indexing Method, illustrates a crank pin processing machine wherein a chuck body is clamped to a machine spindle during machining operations, and, subsequent to the first operation, the chuck body is relatively rotated with respect to the mounting spindle, to position the crank pins onto the spindle axis. Rotation of the chuck relative to the spindle is accomplished by a gear affixed to the chuck body, driven by a pinion of a hydraulic indexing motor mounted to the machine headstock. After being indexed, the pinion is axially withdrawn from engagement with the gear, and the chuck body is reclamped to the machine spindle for machining the next crank pin diameter.

The aforementioned devices include complex mechanisms for clamping, unclamping, and reclamping either the workpiece or the chuck body when the workpiece is to be indexed about the fixtured axis. And, in all instances, the second diameter to be machined is rotated in the same direction about the spindle axis as when the first diameter was machined.

The present invention obviates disadvantages inherent in the prior art devices, by providing a simplified eccentric index mechanism which is shifted between two positions by inertial forces alone. In it, neither the workpiece nor the chuck body has to be clamped and unclamped for subsequent indexes.

SUMMARY OF THE INVENTION

It is an object of the present invention to provide a simplified chucking mechanism which is capable of indexing a workpiece relative to a chuck spindle, without need for clamping and unclamping the workpiece at index time.

Another object of the present invention is to provide a simplified chucking mechanism which is capable of indexing a workpiece relative to a chuck spindle, without need for clamping and unclamping the chuck relative to the spindle at index time Still another object of the present invention is to provide a chuck capable of indexing a workpiece relative to the chuck body under the influence of inertial forces.

The invention is shown embodied in a rotary chucking apparatus for automatically turning a part about alternate axes of rotation, comprising: a chuck body, having a body axis of rotation; a cam unit; bearing means affixed to the body for rotatably supporting the cam unit about a first cam unit axis with respect to the body, and for permitting the cam unit to freely rotate, in opposite directions, within a predetermined arc, in accordance with chuck body rotation and inertial forces acting on the cam unit; chuck means affixed to the cam unit for holding a workpiece with respect to a second cam unit axis, the first and second cam unit axes being parallel and spaced-apart; and stop means for limiting rotary movement of the cam unit with respect to the chuck body, and for transmitting a driving force to the cam unit from the chuck body, in reverse directions, whereby a directional change of rotation of the chuck body, about its body axis, will cause the cam unit to rotate about its first cam unit axis with respect to the chuck body and position the second cam unit axis and workpiece with respect to the body axis for a workpiece operation.

BRIEF DESCRIPTION OF THE DRAWINGS

FIG. 3 is a simplified view, in partial section, of the chuck used in the machine of FIG. 1.

FIG. 4 is a cross-sectional view taken along the line 4—4 FIG. 3.

FIG. 5 is a side view, in partial section, of the chuck of FIG. 3, having its inner parts relatively rotated with respect to the chuck body.

FIG. 6 is a cross-sectional view taken along the line 6—6 of FIG. 5.

DESCRIPTION OF THE INVENTION

Figure 1:
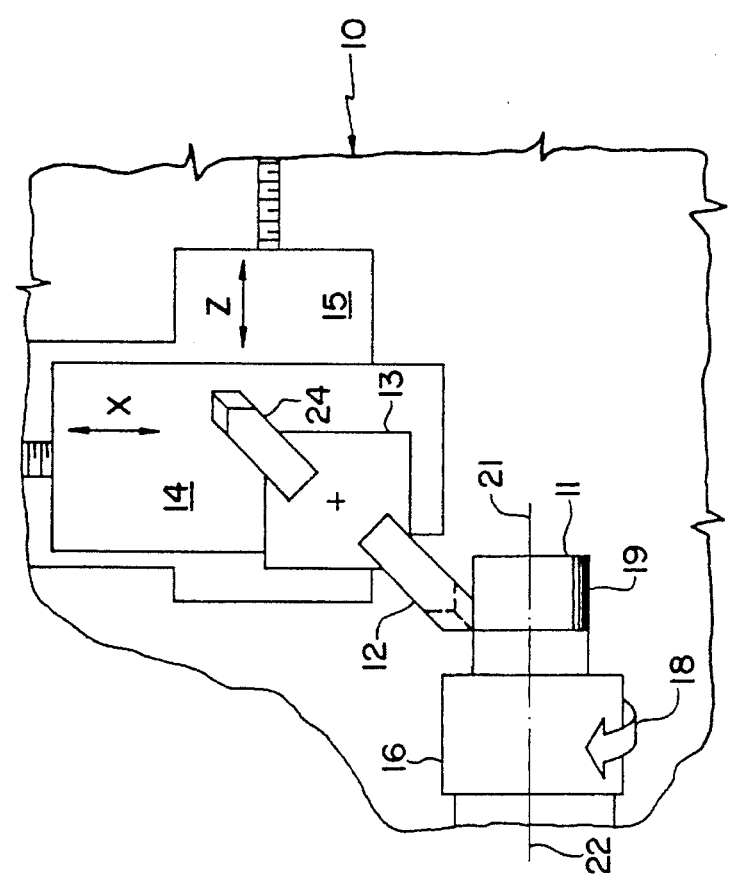
FIG. 1 is a plan view of a turning machine having one spindle.

Referring to the drawings, FIG. 1 is a plan view of a two axis turning machine 10 for performing turning operations on a workpiece 11. In such operations, a cutting tool 12 is advanced against a rotating workpiece 11. A tool turret 13 is supported on coordinately movable X and Z slides 14, 15, the X slide 14 being movable radially of the workpiece 11 and the Z slide 15 being movable axially of the workpiece 11. When a workholding chuck 16, mounted to the machine spindle 17, supports and drives the workpiece 11 in a single rotary direction indicated by the broad arrow 18, a first workpiece diameter 19 is generated, and additional, concentric work diameters (not shown) are easily produced. Here it should be noted that many conventional chucking devices are suitable for workpieces having only concentric diameters. In the case of the workpiece 11 shown in FIG. 1, however, it is desired that the machine 10 produce a second diameter 20 (see FIG. 2), eccentric to the first diameter 19, during the subsequent machining operation.

Figure 2:
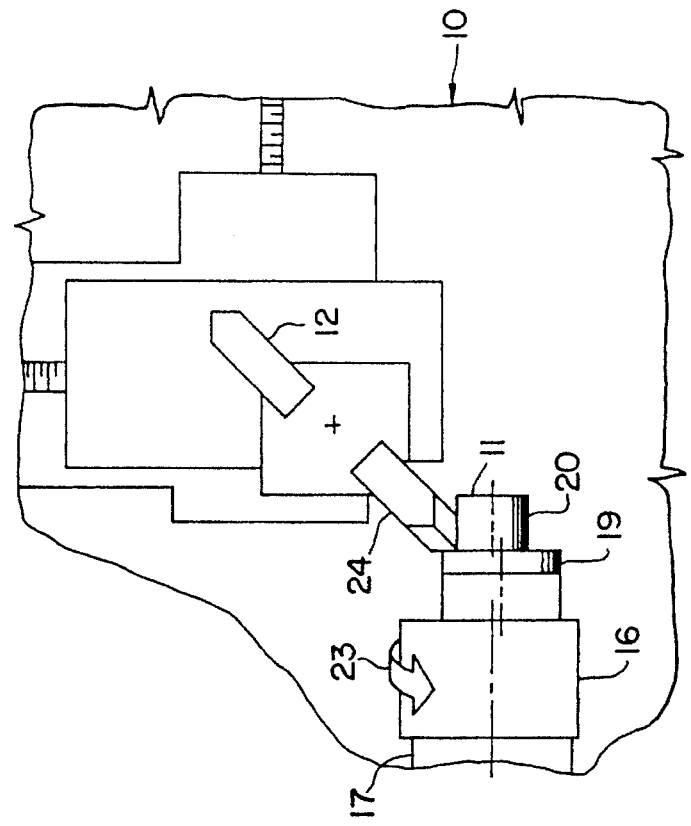
FIG. 2 is a plan view of the turning machine of FIG. 1, with the spindle rotating in the opposite direction.

In order to accomplish a shift of the workpiece main axis 21 relative to the rotary axis 22 of the machine spindle 17, the chuck 16 is simply rotated in the opposite direction, indicated by the broad arrow 23 of FIG. 2. Those having ordinary skill in the turning art will, of course, appreciate that the tool 24 for performing the subsequent turning operation must have its cutting edge correctly oriented with the reversely-rotating workpiece 11 for proper cutting action. FIGS. 3–5 depict a preferred embodiment and illustrate, in simplified form, principles of this special chuck 16.

In FIG. 3, the chuck 16 has a chuck body 25 mounted to the machine spindle 17 for rotation therewith about the spindle axis 22, i.e. the spindle axis 22 is the body axis of rotation. The chuck body 25 is machined with a central bore 26 eccentric to the spindle axis 22, and suitable antifriction bearings 27, preferably ball bearings, are fitted within the bore 26 to freely and rotatably support a cam unit 28.

With reference also to FIG. 4, the cam unit 28 has a slot 29 machined about its periphery, through a predetermined arc, and a pin 30 affixed to the chuck body 25, is radially inserted into the slot 29. The pin 30 comprises a stop means for limiting the reverse rotary movement of the cam unit 28 with respect to the chuck body 25; arcuate movement in this example is 90°. The radial pin 30 is located between the bearings 27 along the length of the cam unit 28. The cam unit has a first axis 31, established by the ball bearings 27, which is displaced from the spindle axis 22 by the eccentricity $e_1$. The cam unit 28 is fitted with an offset chuck means 32, which may be any of a variety of well-known devices for holding a workpiece; for example, collet chuck, diaphragm chuck, etc. In the design of FIG. 3, the chuck means 32 is mounted to the cam unit 28 about a second cam unit axis 33, coaxially with the spindle axis 22, so that a first diameter 19 may be processed concentrically with the spindle axis 22. It should be noted, though, that further embodiments of the invention may find it useful to displace the chuck means 32 and second cam unit axis 33 from the spindle axis 22, and such an application will be discussed further in connection with FIGS. 8 and 9. Referring still to FIGS. 3 and 4, it can be seen that when the spindle 17 drives the chuck body 25 in the direction shown, the chuck body 25 and cam unit 28 will rotate in unison about the spindle axis 22 due to engagement of the radial pin 30 with the end 34 of the slot 29.

Now, with reference to FIGS. 5 and 6, when the direction of spindle rotation is reversed, the chuck body 25 and its radial pin 30 will, of course, move in the direction of the broad arrow 35 of FIG. 5, but, due to the inertia of the cam unit 28, chuck means 32, and workpiece 11, the cam unit 28 will not immediately follow the reversal of movement; i.e., there is some lost motion, and the relative free movement between the chuck body 25 and cam unit 28 will cause the radial stop pin 30 to engage the other end 36 of the arcuate slot 29. At such time, the chuck body 25 and cam unit 28 will rotate in unison in the direction 35 shown in FIGS. 5 and 6. This relative free rotation between the cam unit 28 and chuck body 25 will cause the axis 21 of the first processed diameter 22 to move off-center relative to the spindle axis 22 (i.e., the chuck body axis). Thereafter, as a second diameter 20 is processed about the chuck body and spindle axis 22, the resulting workpiece will have displaced first and second diameters 19, 20 of eccentricity $e_2$.

Figure 7:
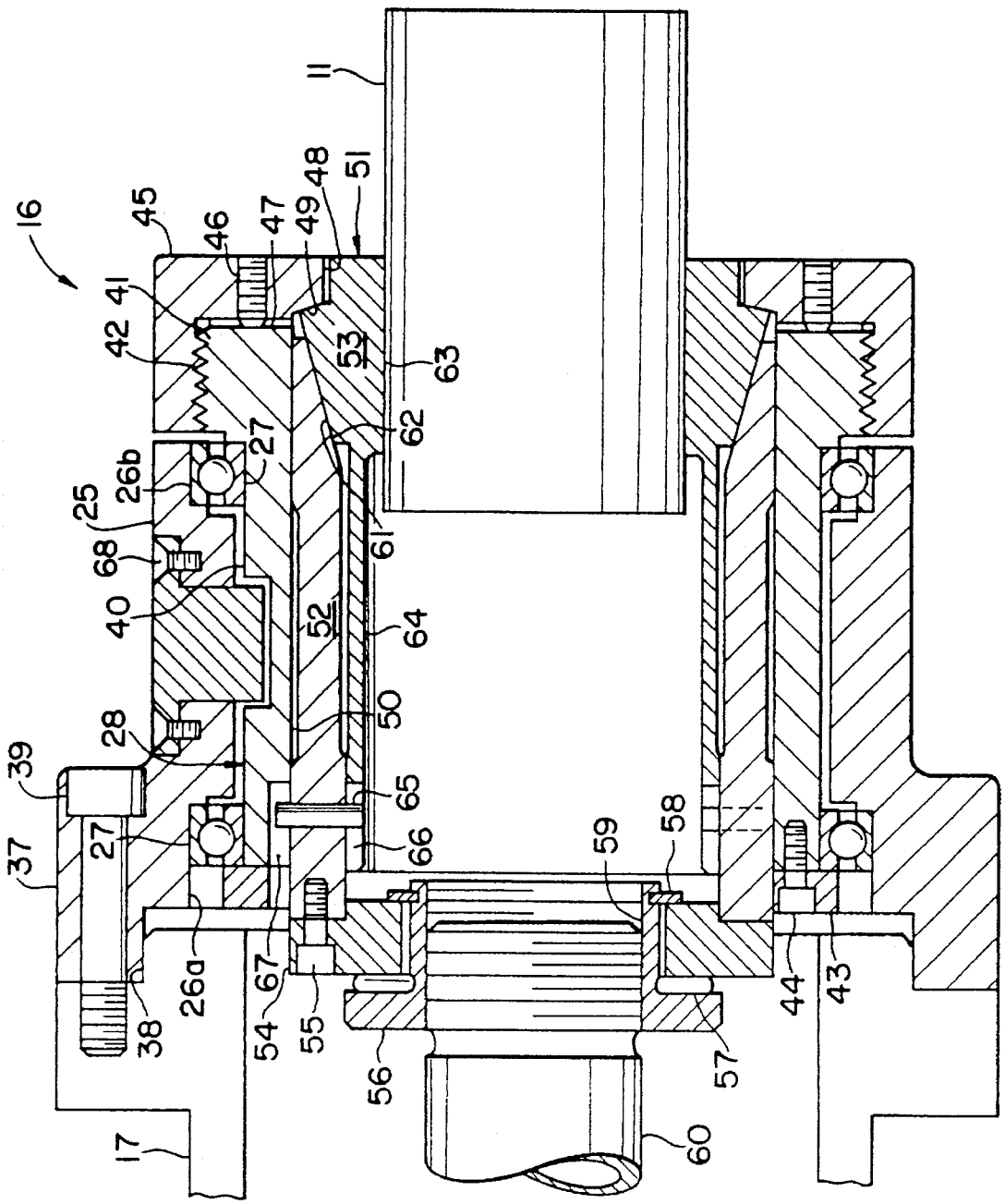
FIG. 7 is a cross-section through the chuck of FIG. 1, illustrating details of construction.

Referring to FIG. 7, more specific details of construction are shown, where the chuck body 25 has a flange 37 and is mounted to a pilot diameter 38 of the spindle 17. Screws 39 passing through the flange 37 secure the chuck body 25 to the spindle 17. A pair of ball bearings 27 mounted in opposite end bores 26a, b in the chuck body 25 serve to support the cam unit 28. The cam unit 28 has a bearing diameter 40, and a front flange 41 which is threaded about its outer diameter 42. A bearing retainer cap 43 is affixed by screws 44 to the rear of the cam unit 28, for locking the cam unit 28 into the bearings 27. The front end of the cam unit 28 is fitted with a threadably received cap 45 which is adjustably positioned with respect to the cam unit 28 by means of set screws 46 passing through the face of the cap 45 and into flange slots 47. The cap 45 has a clearance bore 48 and is back-faced with a spherical seat 49.

The central bore 50 of the cam unit 28 receives a collet assembly 51, having first and second collet parts 52, 53. The first collet part 52 is slidably received within the cam unit bore 50, and has a rear cap 54 affixed thereto. The rear cap 54 is mounted around the hub 55 of a flanged bearing member 56, wherein the cap 54 is constrained from relative axial movement between a thrust bearing 57 and a retainer ring 58. The hub 55 has a threaded bore 59 which receives a threaded drawbar 60. The drawbar 60 is actuated for axial movement by power means (not shown). The second collet part 53 comprises a split rearwardly-converging conical head 61 received in a mating conical bore 62 of the first collet part 52, so that as relative axial movement occurs between the first and second collet parts 52, 53, the head 61 will be deflected radially, in the well-known split collet manner, to grasp a workpiece 11. The second collet part 53 has a central bore 63 sized to receive the workpiece 11. The head 61 is shouldered against the spherical seat 41 of the front cap 45, so that forwardly thrusting movement (i.e., to the right of FIG. 7) of the first collet part 52 will cause only radial movement of the head 61. The second collet part 53 also has a tubular cylindrical portion 64 extending to the rear of the first collet part 52. A pin 65 extends through the wall of the first collet part 52, near the rear, into first and second axial slots 66, 67 formed within the cam unit 28 and second collet part 53, respectively, so that the cam unit 28 and collet assembly 51 will rotate in unison, yet permit relative axial movement of the first collet part 52. The end cap 54 of the first collet part 52 has a clearance bore to permit some radial motion to occur as the cam unit 28 throws the workpiece 11 in displacing its axis. The radial stop pin 30 is formed as a wide block secured by a pair of screws 68, and extends into a wide arcuate slot 29 (ref. FIG. 4) machined into the cam unit 28.

Figure 8:
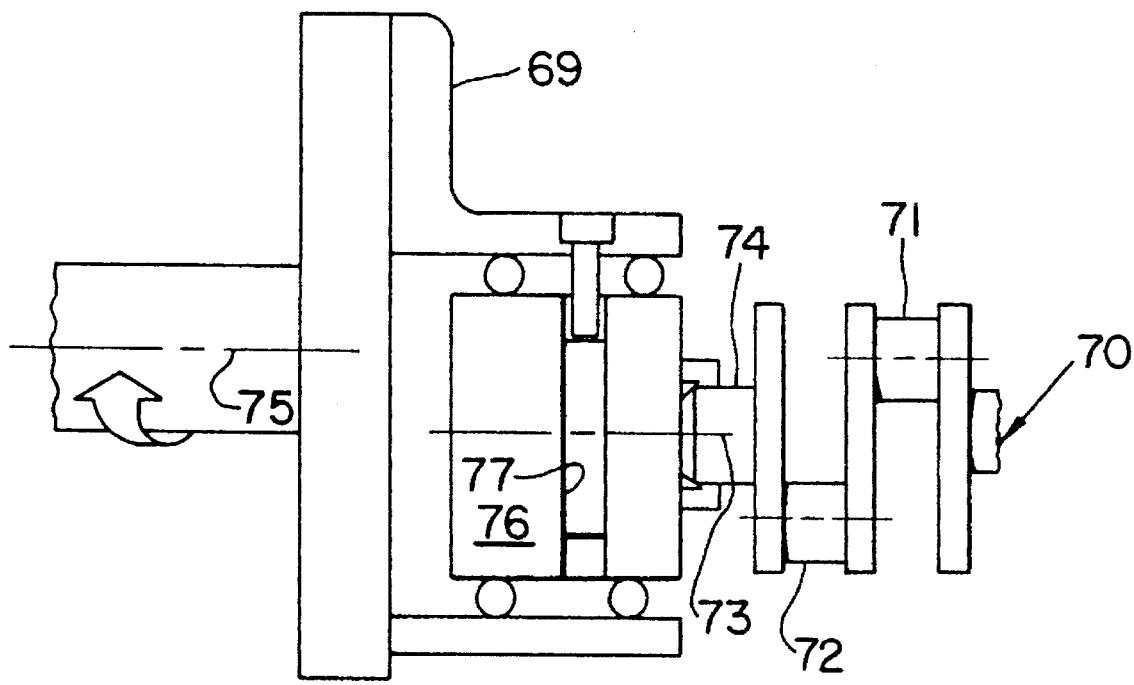
FIGS. 8 and 9 are plan views of a chuck for processing a crankshaft.
Figure 9:
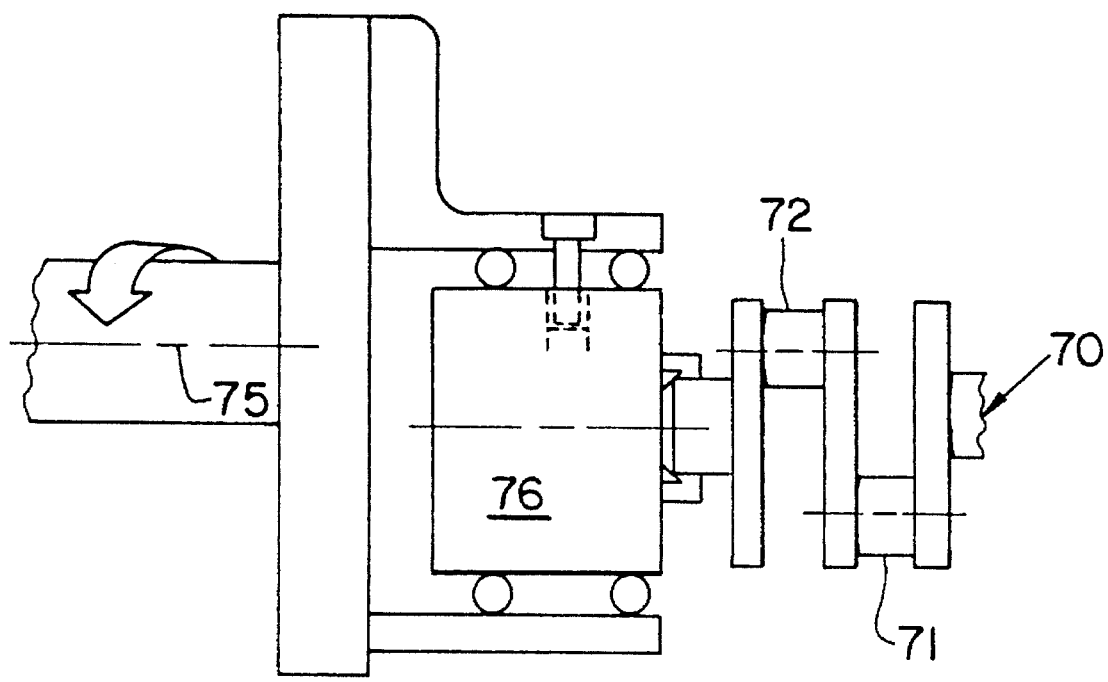

FIGS. 8 and 9 illustrate an alternative embodiment of a chuck 69 in accordance with the foregoing principles, supporting a crankshaft 70 having first and second crank pins 71, 72 disposed 180° opposite to one another about the main bearing axis 73. In this case, the main bearing diameter 74 is chucked off-center from the chuck body and spindle axis 75. After the first crank pin 71 is processed, the cam unit 76, provided with a 180® slot 77, is inertially rolled by reverse rotation to move the second crank pin 72 into the position of FIG. 9 for subsequent processing. It may be noted that machines for performing operations on crankshafts often drive both ends of the crankshaft to avoid twisting the workpiece.

Figure 10A:
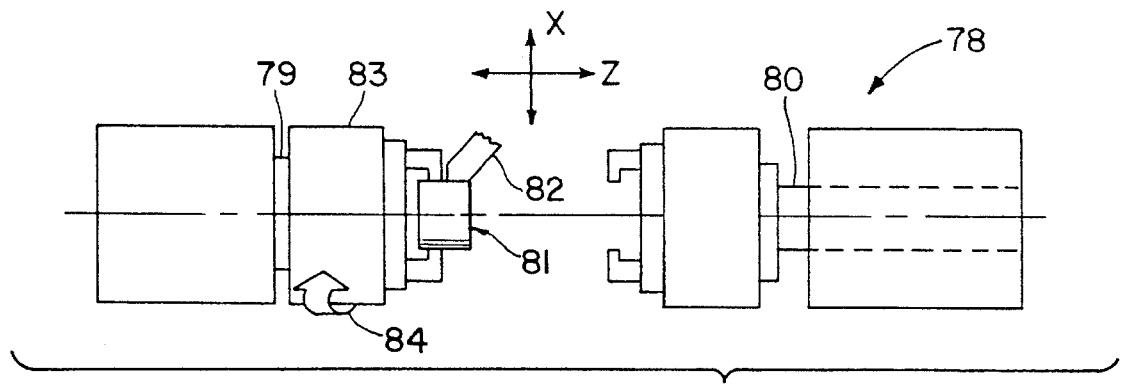
FIGS. 10a–d are sequential plan views of a turning machine having a main spindle and a subspindle.
Figure 10B:
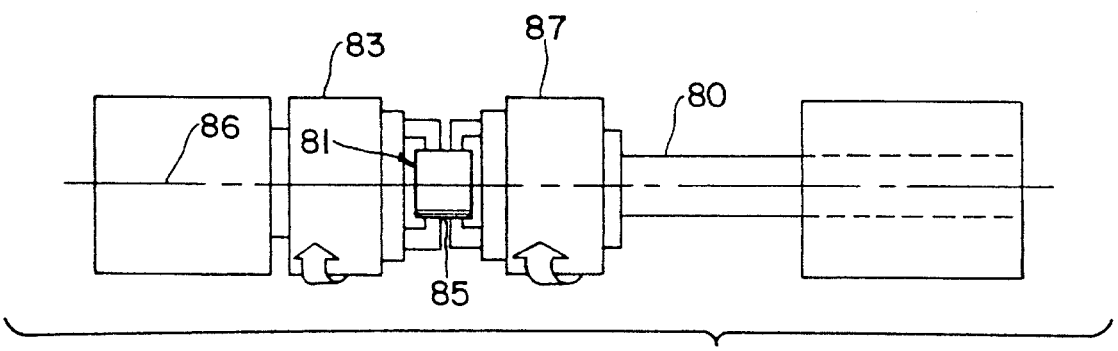
Figure 10C:
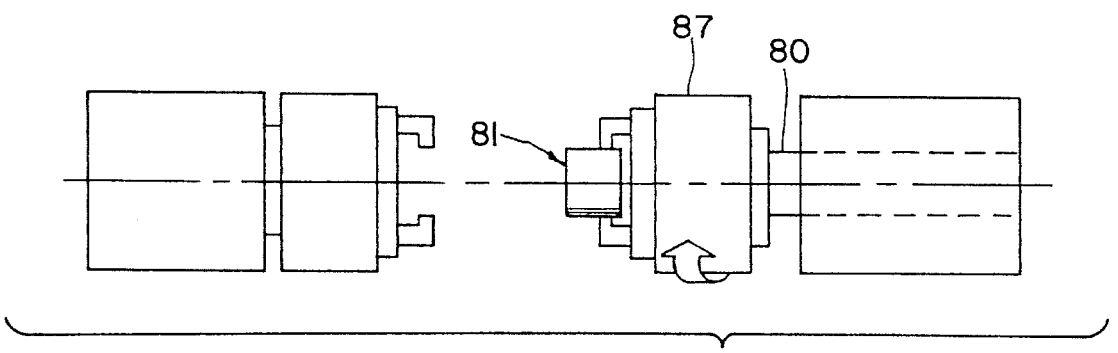
Figure 10D:
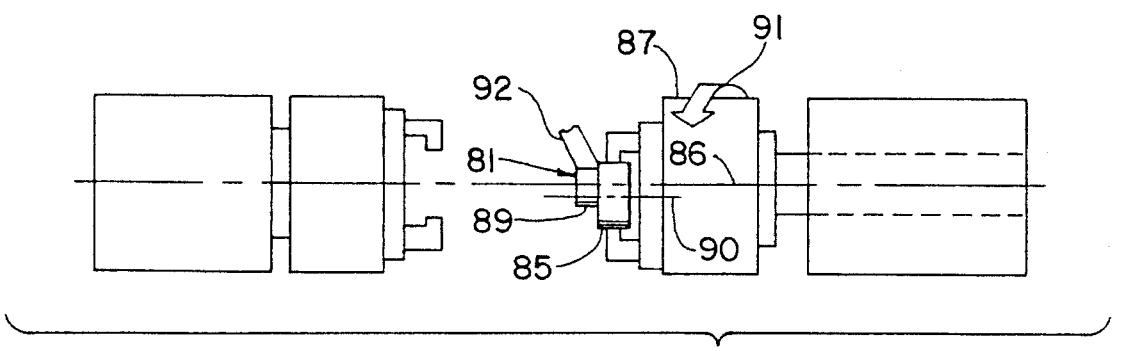

FIGS. 10a–d are sequential plan views of an alternative embodiment. FIG. 10a depicts a two axis turning machine 78 having a main spindle 79 and an extendible subspindle 80, coaxially opposed to one another, for performing first and second operations on a workpiece 81, i.e., operations on both ends. In machines of this type, a cutting tool 82 is supported on coordinately movable X and Z slides (not shown); the cutting tool 82 is movable in both an X direction, radially of the workpiece 81, and a Z direction, axially of the workpiece 81. A first chuck 83 mounted to the main spindle 79 supports and drives the workpiece 81 in a first rotary direction indicated by the broad arrow 84. The first chuck 83 may be any of a variety of well-known chucks which can be power-actuated to grasp and release the workpiece 81. Referring next to FIG. 10b, after a first diameter 85 is produced about the common spindle axis 86, the subspindle 80 is moved axially towards the workpiece 81 while its subspindle chuck 87 is rotating in the same direction as the first chuck 83; the subspindle chuck 87 (a mirror image of the chuck of FIG. 1) is constructed in accordance with the principles of FIGS. 3 and 4, so as to rotate the subspindle chuck grippers 88 concentrically with the common spindle axis 86. The subspindle chuck 87 grasps the workpiece 81 while it is still rotating, and the first chuck 83 releases the workpiece 81. As shown in FIG. 10c, the subspindle 80 then retracts to its home position in preparation for the second operation. Finally, with reference to FIG. 10d, it is desired that the second machining operation produce a second diameter 89 eccentric to the first diameter 85. In order to accomplish a shift of the workpiece main axis 90 relative to the common spindle axis 86, the subspindle chuck 87 is simply rotated in the opposite direction, indicated by the broad arrow 91, in accordance with the principles shown in FIGS. 5 and 6. Those having ordinary skill in the turning art will, of course, appreciate that the tool 92 for performing the subspindle second turning operation must have its cutting edge correctly oriented with the reversely-rotating workpiece 81 for proper cutting action.

It will be appreciated by those skilled in the art that the invention is applicable to systems which grip workpieces on interior or exterior surfaces, and to systems which machine interior or exterior surfaces.

While the invention has been shown in connection with a preferred embodiment, and alternative embodiments, it is not intended that the invention be so limited; rather, the invention extends to all such designs and modifications as come within the scope of the appended claims.

What is claimed is:

1. A rotary chucking apparatus for automatically turning a workpiece about alternate axes of rotation, comprising:

a chuck body, having a body axis of rotation;

a cam unit;

bearing means affixed to said body for rotatably supporting said cam unit about a first cam unit axis with respect to said body, and for permitting said cam unit to freely rotate, in opposite directions, within a predetermined arc, in accordance with chuck body rotation and inertial forces acting on said cam unit;

chuck means affixed to said cam unit for holding a workpiece with respect to a second cam unit axis, said first and second cam unit axes being parallel and spaced apart; and stop means for limiting rotary movement of said cam unit with respect to said chuck body, and for transmitting a driving force to said cam unit from said chuck body, in reverse directions;

whereby a directional change of rotation of said chuck body, about its body axis, will cause said cam unit to rotate about its first cam unit axis with respect to said chuck body and position said second cam unit axis and workpiece with respect to said body axis for a workpiece operation.

2. A method for chucking and automatically turning a workpiece about alternate axes of rotation for processing operations, comprising the following steps:

providing a machine having a spindle which is reversely-rotatable about a spindle axis;

securing a chuck body to said spindle, said chuck body having a body axis of rotation coextensive with said spindle axis;

mounting a cam unit within said body for rotation about a first cam unit axis with respect to said body, and permitting said cam unit to freely rotate, in opposite directions, within a predetermined arc, in accordance with chuck body rotation and inertial forces acting on said cam unit;

affixing a chuck means to said cam unit for holding a workpiece with respect to a second cam unit axis, said first and second cam unit axes being parallel and spaced apart;

providing a stop means for limiting rotary movement of said cam unit with respect to said chuck body, in reverse directions;

rotating said spindle in a first direction and driving said chuck body, cam unit and workpiece in unison;

processing a first workpiece diameter;

reversely-rotating said spindle and chuck body in a second direction and effectuating lost motion between said cam unit and chuck body, thereby displacing said first workpiece diameter offset with respect to the spindle axis; and processing a second workpiece diameter, eccentric with said first workpiece diameter.

3. A rotary chucking apparatus according to claim 1, further comprising:

means for rotating said chuck body about its body axis, in reverse directions.

4. A method for chucking and automatically turning a workplace about alternate axes of rotation for processing operations, comprising the following steps:

providing a chuck body having a body axis of rotation;

mounting a cam unit within said body for rotation about a first cam unit axis with respect to said body, and permitting said cam unit to freely rotate, in opposite directions, within a predetermined arc, in accordance with chuck body rotation and inertial forces acting on said cam unit:

affixing a chuck means to said cam unit for holding a workplace with respect to a second cam unit axis, said first and second cam unit axes being parallel and spaced apart;

providing a stop means for limiting rotary movement of said cam unit with respect to said chuck body, in reverse directions;

rotating said chuck body in a first direction and driving said chuck body, cam unit and workpiece in unison;

reversely-rotating said spindle and chuck body in a second direction and effectuating lost motion between said cam unit and chuck body, thereby displacing said workplace offset with respect to the body axis; and processing a workplace diameter which is eccentric with one of said first and second cam unit axes.

* * * * *